(12) United States Patent
Noh et al.

(10) Patent No.: US 9,109,154 B2
(45) Date of Patent: Aug. 18, 2015

(54) APPARATUS AND METHOD FOR AUTOMATICALLY MIXING PHOSPHOR

(75) Inventors: Myeong Ho Noh, Cheongju-si (KR); Choo Ho Kim, Yongin-si (KR); Song Ho Jeong, Hwaseong-si (KR); Dong Hee Lim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 915 days.

(21) Appl. No.: 13/289,693

(22) Filed: Nov. 4, 2011

(65) Prior Publication Data

US 2012/0123591 A1     May 17, 2012

(30) Foreign Application Priority Data

Nov. 12, 2010 (KR) ........................ 10-2010-0112630

(51) Int. Cl.
| | |
|---|---|
| *B01F 3/08* | (2006.01) |
| *B01F 15/02* | (2006.01) |
| *C09K 11/02* | (2006.01) |
| *B01F 13/10* | (2006.01) |
| *B01F 15/04* | (2006.01) |

(52) U.S. Cl.
CPC ............ *C09K 11/02* (2013.01); *B01F 13/1072* (2013.01); *B01F 15/0445* (2013.01); *B01F 13/1069* (2013.01)

(58) Field of Classification Search
CPC ............ B01F 13/1072; B01F 15/0445; B01F 17/0072; B01F 2015/0221; B01F 13/1069
USPC .......................... 366/177.1, 144, 181.8, 182.1
See application file for complete search history.

(56) References Cited

U.S. PATENT DOCUMENTS

| | | | | |
|---|---|---|---|---|
| 1,812,604 | A | * | 6/1931 | Morrow ..................... 366/179.1 |
| 2,548,106 | A | * | 4/1951 | Hancock et al. .............. 366/141 |
| 2,571,655 | A | * | 10/1951 | Beare ........................... 366/76.1 |
| 2,925,184 | A | * | 2/1960 | Powischill et al. ........... 414/270 |
| 3,877,683 | A | * | 4/1975 | Frank et al. .................... 366/261 |
| 4,277,184 | A | * | 7/1981 | Solomon ....................... 366/139 |
| 4,525,071 | A | * | 6/1985 | Horowitz et al. ............. 366/141 |
| 4,581,704 | A | * | 4/1986 | Mitsukawa ................... 700/239 |
| 5,006,995 | A |   | 4/1991 | Toschi et al. |
| 5,268,849 | A | * | 12/1993 | Howlett et al. ............... 700/226 |
| 5,431,200 | A | * | 7/1995 | Mariotti .......................... 141/83 |
| 5,584,326 | A | * | 12/1996 | Galli ............................... 141/83 |
| 5,593,267 | A | * | 1/1997 | McDonald et al. ........... 414/273 |

(Continued)

FOREIGN PATENT DOCUMENTS

| | | |
|---|---|---|
| CN | 1031486 A | 3/1989 |
| CN | 2544795 Y | 4/2003 |

(Continued)

OTHER PUBLICATIONS

Communication, dated May 2, 2012, issued by the European Patent Office in counterpart European Patent Application No. 11188917.6.

(Continued)

*Primary Examiner* — Tony G Soohoo
(74) *Attorney, Agent, or Firm* — Sughrue Mion, PLC

(57) ABSTRACT

An apparatus and method for automatically mixing a phosphor are provided, which are capable of automatically supplying accurate quantities of a phosphor and silicon to a mixing container using a phosphor supply unit and a silicon supply unit.

12 Claims, 10 Drawing Sheets

(56) References Cited

U.S. PATENT DOCUMENTS

| | | | |
|---|---|---|---|
| 6,188,936 B1* | 2/2001 | Maguire et al. | 700/265 |
| 6,196,712 B1* | 3/2001 | Elm | 366/197 |
| 6,915,823 B2* | 7/2005 | Osborne et al. | 141/27 |
| 7,341,676 B2 | 3/2008 | Okada et al. | |
| 7,543,979 B2* | 6/2009 | Yeh | 366/141 |
| 7,815,361 B2* | 10/2010 | Lindblom | 366/136 |
| 7,972,056 B2* | 7/2011 | Lontoc | 366/150.1 |
| 8,003,143 B2* | 8/2011 | Taylor | 426/231 |
| 8,256,950 B2* | 9/2012 | Solignac | 366/138 |
| 2003/0192616 A1* | 10/2003 | Larson et al. | 141/2 |
| 2003/0232005 A1 | 12/2003 | Okada et al. | |
| 2004/0104244 A1* | 6/2004 | Cline et al. | 222/63 |
| 2004/0153210 A1* | 8/2004 | Schneider | 700/240 |
| 2004/0154690 A1* | 8/2004 | Osborne et al. | 141/27 |
| 2006/0197432 A1 | 9/2006 | Nagatomi et al. | |
| 2008/0051936 A1* | 2/2008 | Lindblom | 700/239 |
| 2008/0087150 A1* | 4/2008 | Stanton et al. | 83/78 |
| 2008/0169043 A1* | 7/2008 | Osborne et al. | 141/1 |
| 2009/0231951 A1* | 9/2009 | Hausmann et al. | 366/152.2 |
| 2010/0043919 A1* | 2/2010 | Solignac | 141/103 |
| 2010/0091606 A1* | 4/2010 | Kwan et al. | 366/139 |
| 2010/0122586 A1* | 5/2010 | Misu | 73/863 |
| 2010/0175931 A1* | 7/2010 | Amato | 177/52 |
| 2010/0243103 A1* | 9/2010 | Ono et al. | 141/129 |
| 2010/0283007 A1 | 11/2010 | Robinson | |
| 2011/0010255 A1* | 1/2011 | Drocco et al. | 705/17 |
| 2011/0214779 A1* | 9/2011 | Goldman et al. | 141/85 |
| 2012/0029687 A1* | 2/2012 | Hagen et al. | 700/218 |
| 2012/0095595 A1* | 4/2012 | Krishnan | 700/248 |
| 2012/0123591 A1* | 5/2012 | Noh et al. | 700/265 |
| 2013/0092087 A1* | 4/2013 | Bachman et al. | 119/51.01 |
| 2013/0110282 A1* | 5/2013 | Omura | 700/233 |
| 2013/0283733 A1* | 10/2013 | Py | 53/425 |
| 2014/0086004 A1* | 3/2014 | Itoh | 366/218 |
| 2014/0086808 A1* | 3/2014 | Itoh | 422/557 |

FOREIGN PATENT DOCUMENTS

| | | |
|---|---|---|
| CN | 201001925 Y | 1/2008 |
| CN | 201052454 Y | 4/2008 |
| CN | 201485258 U | 5/2010 |
| KR | 10-0696937 B1 | 3/2007 |
| KR | 10-0979672 B1 | 9/2010 |
| WO | 93/01888 A1 | 2/1993 |
| WO | 2009/008636 A2 | 1/2009 |

OTHER PUBLICATIONS

Communication dated Jan. 21, 2014 issued by the Taiwanese Patent Office in counterpart Taiwanese Patent Application No. 100139076.
Communication dated Nov. 6, 2013, issued by the State Intellectual Property Office of P.R.C. in counterpart Chinese Application No. 201110372579.0.

* cited by examiner

APPARATUS AND METHOD FOR AUTOMATICALLY MIXING PHOSPHOR

CROSS-REFERENCE TO RELATED APPLICATION

This application claims the benefit of Korean Patent Application No. 10-2010-0112630, filed on Nov. 12, 2010, in the Korean Intellectual Property Office, the disclosure of which is incorporated herein by reference.

BACKGROUND

1. Field

Example embodiments of the following description relate to an apparatus and method for automatically mixing a phosphor, capable of mixing the phosphor automatically and accurately.

2. Description of the Related Art

In general, a light emitting diode (LED) refers to a device that converts an electric current to light. The LED has a long lifespan, a low power consumption, a fast response time, and an excellent initial driving characteristics. Therefore, the LED is being widely applied, for example, to a lighting device, an electric sign, a backlight unit of a display device, and the like.

Recently, a package type LED where phosphors are disposed around an LED has been developed to obtain white light from ultraviolet (UV) or a blue LED. Specifically, lights emitted from UV or the blue LED are partially color-converted by phosphors having colors of red, green, blue, yellow, and the like. The white light is achieved by mixing the converted lights.

Manufacturing processes of the LED package include forming of a passivation layer, for a wire connected to an LED chip of a substrate which is passed through wire bonding, and dispensing for electrically insulating the wire. The dispensing is performed in order of 'mixing→discharging→curing.'

Among the processes of dispensing, the mixing is an important procedure that determines an emission color of the LED package by adjusting a mixing ratio of phosphor and silicon according to characteristics of the LED chip. However, such an important procedure, that is, the mixing of the phosphor and the silicon has generally been performed by a manual operation.

SUMMARY

According to example embodiments, there may be provided an apparatus and method for automatically mixing a phosphor with silicon in a mixing process.

According to example embodiments, there may be also provided an apparatus and method for mixing a phosphor with silicon automatically and quickly with an accurate mixing ratio and accurate mixing quantities.

According to example embodiments, there may be also provided an apparatus and method for automatically mixing a phosphor with silicon, capable of conveniently adjusting the mixing ratio and the mixing quantities of the phosphor and the silicon.

The foregoing and/or other aspects are achieved by providing an apparatus for automatically mixing a phosphor including a mixing container to receive a first silicon, a second silicon, and a phosphor; a silicon supply unit to supply silicon to the mixing container, up to a predetermined quantity; a phosphor supply unit to supply the phosphor to the mixing container, up to a predetermined quantity; and a transfer unit to transfer the mixing container sequentially to the silicon supply unit and the phosphor supply unit.

Therefore, the transfer unit may sequentially transfer the mixing container to the silicon supply unit and the phosphor supply unit. The silicon supply unit and the phosphor supply unit may supply the silicon and the phosphor up to the predetermined quantities. Accordingly, the second silicon and the phosphor may be mixed in the mixing container by an accurate mixing ratio.

The silicon supply unit may include a first silicon supply unit to supply the first silicon to the mixing container up to the predetermined quantity; and a second silicon supply unit to supply the second silicon to the mixing container, up to the predetermined quantity, and the silicon may be prepared by mixing the first silicon and the second silicon.

The apparatus may further include a container supply unit disposed at an entrance of the transfer unit to supply the mixing container to the transfer unit; and a container discharge unit disposed at an exit of the transfer unit to discharge the mixing container, receiving the silicon and the phosphor, from the transfer unit. Therefore, the mixing container may be continuously supplied to or discharged from the transfer unit by the container supply unit and the container discharge unit.

The apparatus may further include a first container sensing unit disposed at a connection portion, between the container supply unit and the transfer unit, to detect the mixture container being supplied from the container supply unit to the transfer unit. The first container sensing unit may detect whether the mixing container is supplied and discharged, and a number of the mixing containers.

The mixing container may include a barcode containing mixing information related to the silicon and the phosphor. The transfer unit, the silicon supply unit, and the phosphor supply unit may be operated according to the mixing information of the barcode detected by the first container sensing unit. For example, the mixing information may include a feed quantity of the silicon, a feed quantity of the phosphor, and a serial number of the mixing container.

The apparatus may further include a second container sensing unit disposed at a connection portion, between the container discharge unit and the transfer unit, to detect the mixing container being discharged from the transfer unit to the container discharge unit.

The transfer unit may include a weight measurement device to measure a weight change of the mixing container. Accordingly, while the mixing container is passing through the silicon supply unit and the phosphor supply unit, the weight measurement device may measure the weight change of the mixing container in real time, thereby checking the feed quantities of the silicon and the phosphor.

A plurality of phosphor supply units may be provided, corresponding to types of the phosphor, being arranged along a transfer path of the transfer unit.

The foregoing and/or other aspects are achieved by providing an apparatus for automatically mixing a phosphor, including a mixing container to receive and discharge a first silicon, a second silicon, and a phosphor; a transfer unit to transfer the mixing container; a first silicon supply unit disposed at a first position on a transfer path of the transfer unit to supply the first silicon to the mixing container up to a predetermined quantity; a second silicon supply unit, disposed at a second position on a transfer path of the transfer unit, to supply the second silicon to the mixing container up to a predetermined quantity; and a phosphor supply unit disposed after at least one of the first silicon supply unit and the second silicon supply unit with respect to a transfer direction of the transfer unit, on the transfer path of the transfer unit.

That is, the mixing container is capable of both receiving the first silicon, the second silicon, and the phosphor to be mixed therein and discharging the mixture to a desired position. For example, the mixing container may have a syringe structure to both receive and discharge the first silicon, the second silicon, and the phosphor.

In addition, since the phosphor supply unit is disposed after the first silicon supply unit and the second silicon supply unit, the phosphor may be supplied to the syringe or to the mixing container. Therefore, the phosphor may be prevented from clogging the outlet of the mixing container.

The phosphor supply unit may be disposed between the first position and the second position with respect to the transfer direction of the transfer unit. That is, any one of the first silicon and the second silicon is supplied first to the mixing container, and the phosphor is supplied to a surface of the any one. Next, the other one is supplied.

The phosphor supply unit may be disposed after the first position and the second position with respect to the transfer direction of the transfer unit. That is, the first silicon and the second silicon may be sequentially supplied first, and the phosphor may be later supplied to surfaces of the first silicon and the second silicon.

A plurality of phosphor supply units may be provided, corresponding to types of the phosphor, and at least one of the plurality of phosphor supply units may be disposed between the first position and the second position with respect to the transfer direction of the transfer unit. That is, any one of the first silicon and the second silicon may be supplied first, and a part of the phosphor may be supplied to the surface of the any part. Next, the other one of the first silicon and the second silicon may be supplied, and the other of the phosphor may be later supplied to a surface of the other.

The foregoing and/or other aspects are also achieved by providing a method for automatically mixing a phosphor, including supplying a mixing container to a transfer unit; detecting a barcode formed on the mixing container by a container sensing unit; setting feed quantities of a first silicon, a second silicon, and a phosphor, using mixing information contained in the barcode detected by the container sensing unit; transferring the mixing container by the transfer unit sequentially to a first silicon supply unit, a second silicon supply unit, and a phosphor supply unit; supplying the first silicon, the second silicon, and the phosphor to the mixing container respectively up to predetermined quantities by the first silicon supply unit, the second silicon supply unit, and the phosphor supply unit; and discharging the mixing container from the transfer unit.

The supplying of the first silicon, the second silicon, and the phosphors may include supplying the first silicon up to a predetermined quantity by the first silicon supply unit; supplying the second silicone up to a predetermined quantity by the second silicon supply unit; and supplying the phosphor up to a predetermined quantity by the phosphor supply unit, wherein the supplying of the phosphor may be performed after at least one of the supplying of the first silicon and the supplying of the second silicon.

The supplying of the phosphors may be performed between the supplying of the first silicon and the supplying of the second silicon.

The supplying of the first silicon, the second silicon, and the phosphors may include measuring a weight change of the mixing container in real time using a weight measurement device provided to the transfer unit; and controlling operations of the first silicon supply unit, the second silicon supply unit, and the phosphor supply unit in real time according to the weight change of the mixing container.

The container sensing unit may include a first container sensor to detect the mixing container being supplied to the transfer unit, and a second container sensor to detect the mixing container being discharged from the transfer unit, and the transfer unit may be operated under the control of detection values of the first container sensor and the second container sensor.

Additional aspects, features, and/or advantages of example embodiments will be set forth in part in the description which follows and, in part, will be apparent from the description, or may be learned by practice of the disclosure.

Effect

According to example embodiments, since a first silicon, a second silicon, and a phosphor are supplied to a predetermined quantity in a mixing container respectively by a first silicon supply unit, a second silicon supply unit, and a phosphor supply unit, an apparatus and method for automatically mixing the phosphor are capable of automatically mixing the first silicon, the second silicon, and the phosphor in the mixing container and adjusting a mixing ratio and mixing quantities of the phosphor and silicon.

Accordingly, mixing of the first silicon, the second silicon, and the phosphor may be performed more quickly and accurately. In addition, since the mixing ratio and the mixing quantities are uniform, reliability and stability of the process and the product quality may be increased. Moreover, waste of the phosphor and the silicon may be reduced, while also saving human labor.

The apparatus and method for automatically mixing a phosphor may set feed quantities of the first silicon, the second silicon, and the phosphor by detecting a barcode of the mixing container. Therefore, the first silicon, the second silicon, and the phosphor may be supplied to the mixing container respectively by different mixing ratios and mixing quantities. Therefore, the mixing ratio and the mixing quantities may be varied according to the design and conditions of a light emitting diode (LED) package. As a result, usefulness of the apparatus may be maximized.

According to the apparatus and method for automatically mixing a phosphor, a weight measurement unit measures a weight change of the mixing container, caused according to supply of the first silicon, the second silicon, and the phosphor. Therefore, the feed quantities of the first silicon, the second silicon, and the phosphor are detected in real time. Accordingly, operations of the first silicon supply unit, the second silicon supply unit, and the phosphor supply unit are properly controlled.

According to the apparatus and method for automatically mixing a phosphor, since the mixing container is capable of receiving and discharging the first silicon, the second silicon, and the phosphor, the first silicon, the second silicon, and the phosphor may be directly injected in the LED package. That is, a separate syringe is not required to transfer the first silicon, the second silicon, and the phosphor from the mixing container. Accordingly, the number of processes and processing time may be reduced. Also, entry of foreign substances and generation of bubbles may be prevented during transfer of the first silicon, the second silicon, and the phosphor.

According to the apparatus and method for automatically mixing a phosphor, the mixing container capable of receiving and discharging the first silicon, the second silicon, and the phosphor is supplied with at least one of the first silicon and the second silicon first and then with the phosphor. Therefore, an outlet of the mixing container may be prevented from clogging due to the phosphor in the form of fine powder.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
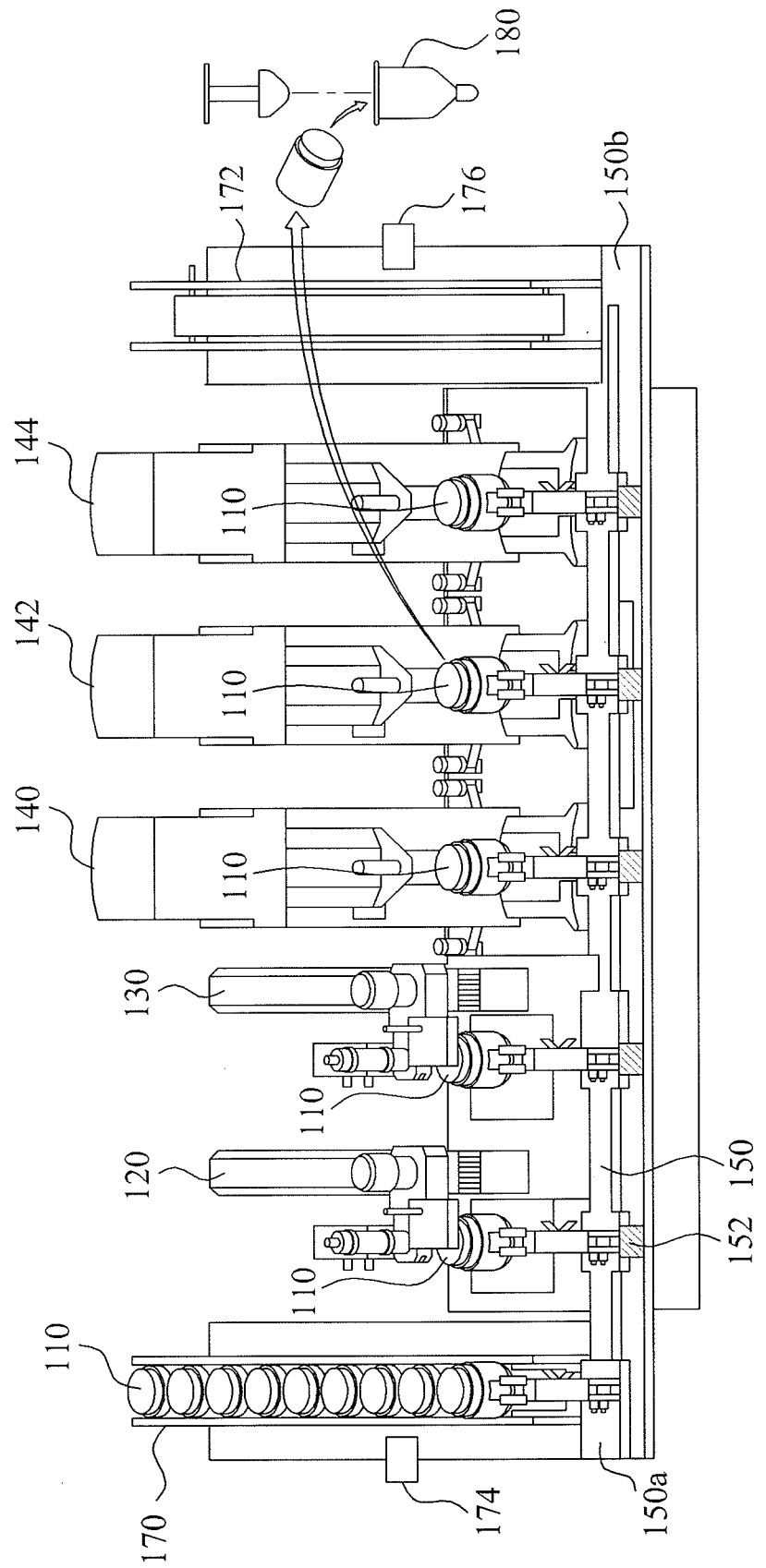
FIG. 1 illustrates a block diagram of an automatic phosphor mixing apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

Figure 2:
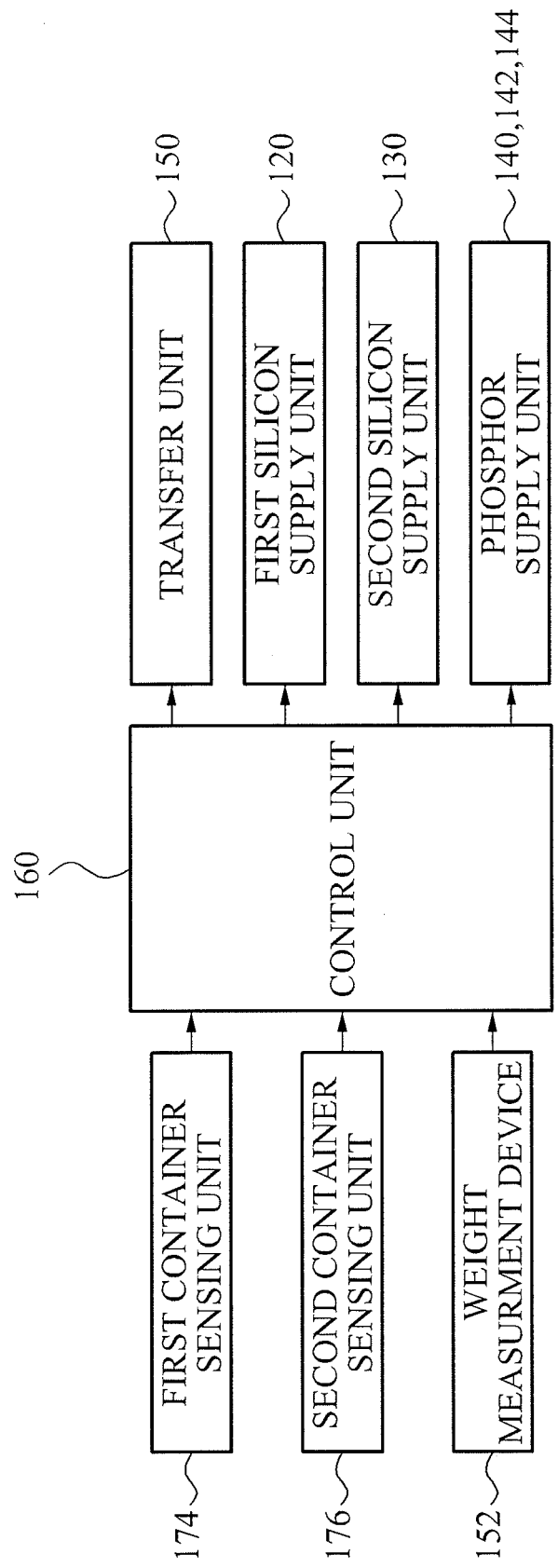
FIG. 2 illustrates a block diagram showing a structure for controlling an operation of the automatic phosphor mixing apparatus shown in FIG. 1.

FIG. 1 illustrates a block diagram of an automatic phosphor mixing apparatus 100 according to example embodiments. FIG. 2 illustrates a block diagram showing a structure for controlling an operation of the automatic phosphor mixing apparatus 100.

Referring to FIGS. 1 and 2, the automatic phosphor mixing apparatus 100 includes a mixing container 110, a first silicon supply unit 120, a second silicon supply unit 130, phosphor supply units 140, 142, and 144, and a transfer unit 150.

The mixing container 110 receives a first silicon, a second silicon, and phosphors. For example, the mixing container 110 may be a mixing cup having a hollow tube shape, including an inlet formed on an upper surface. Although the mixing container 110 will be explained as a mixing cup hereinafter, embodiments are not limited thereto. That is, various types of containers capable of receiving the first silicon, the second silicon, and the phosphors may be applied.

Here, the first silicon and the second silicon may be supplied to the mixing container 110 in a liquid state. The phosphor may be supplied to the mixing container 110 in a fine powder state. The first silicon and the second silicon may be cured into solid silicon only when mixed together. The solid silicon may support the phosphor in the form of fine powder.

The first silicon supply unit 120 may supply the first silicon to an inside of the mixing container 110 up to a predetermined quantity. The first silicon supply unit 120 may be disposed on a transfer path of the transfer unit 150. The first silicon supply unit 120 may be disposed at an upper part of the transfer unit 150 so as to supply the first silicon to the mixing container 110 provided to the transfer unit 150.

The second silicon supply unit 130 may supply the second silicon to the inside of the mixing container 110 up to a predetermined quantity. The second silicon supply unit 130 may be disposed on the transfer path, of the transfer unit 150. The second silicon supply unit 130 may be disposed at the upper part of the transfer unit 150 so as to supply the second silicon to the mixing container 110 provided to the transfer unit 150.

The first silicon supply unit 120 and the second silicon supply unit 130 may be arranged along the transfer unit at a predetermined distance from each other. Although the first silicon supply unit 120 and the second silicon supply unit 130 according to the present embodiments will be explained as being singular, positions and a number of the first silicon supply unit 120 and the second silicon supply unit 130 are not specifically limited and may be varied according to the design and conditions of the automatic phosphor mixing apparatus 100.

The phosphor supply units 140, 142, and 144 may supply the phosphors to the inside of the mixing container 110 up to a predetermined quantity. The phosphor supply units 140, 142, and 144 may be disposed on the transfer path of the transfer unit 150, and more particularly, at the upper part of the transfer unit 150 to supply the phosphors to the mixing container 110 provided to the transfer unit 150.

A plurality of phosphor supply units, that is, the phosphor supply units 140, 142, and 144 may be provided according to types of the phosphors to be supplied to the mixing container 110. The phosphor supply units 140, 142, and 144 may be linearly and separately arranged along the transfer unit of the transfer unit 150. Accordingly, the first silicon supply unit 120, the second silicon supply unit 130, and the phosphor supply units 140, 142, and 144 may be linearly arranged along the transfer path. Although the present embodiments will be explained to include three phosphor supply units 140, 142, and 144 to supply three types of the phosphors, positions and a number of the phosphor supply units are not specifically limited and may be varied according to the design and conditions of the automatic phosphor mixing apparatus 100.

The transfer unit 150 may transfer the mixing container 110 to the first silicon supply unit 120, the second silicon supply unit 130, and the phosphor supply units 140, 142, and 144. Since the first silicon supply unit 120, the second silicon supply unit 130, and the phosphor supply units 140, 142, and 144 are arranged linearly, the transfer path of the transfer unit 150 also has a linear form. Therefore, the transfer unit 150 may transfer the mixing container 110 to the first silicon supply unit 120, the second silicon supply unit 130, and the phosphor supply units 140, 142, and 144 in various orders.

The transfer unit 150 may be structured in various manners to be capable of stably transferring the mixing container 110. For example, the transfer unit 150 may be a conveyer belt system or a robot arm system.

In addition, the transfer unit 150 may include a weight measurement device 152 to measure a weight change of the mixing container 110. The weight measurement device 152 may be disposed around a mounting position of the mixing container 110, and may be structured in various manners capable of measuring a weight of the mixing container 110. Therefore, the weight change of the mixing container 110 may be detected in real time during supply of the first silicon, the second silicon, and the phosphors. Consequently, feed quantities of the first silicon, the second silicon, and the phosphors may be detected in real time. A control unit 160 of the automatic phosphor mixing apparatus 100 may control the feed quantities with respect to the first silicon supply unit 120, the second silicon supply unit 130, and the phosphor supply unit 140, 142, and 144 in real time, through detection values of the weight measurement device 152.

When the transfer unit 150 transfers the mixing container 110 sequentially to the first silicon supply unit 120, the second silicon supply unit 130, and the phosphor supply units 140, 142, and 144 as described above, the first silicon, the second silicon, and the phosphors are automatically supplied to the inside of the mixing container 110 by the predetermined quantities to the mixing container 110, respectively by the first silicon supply unit 120, the second silicon supply unit 130, and the phosphor supply unit 140, 142, and 144. Thus, the first silicon, the second silicon, and the phosphors are received in the mixing container 110 by the predetermined quantities, and therefore may be mixed with accurate mixing ratio and accurate mixing quantities.

Referring to FIGS. 1 and 2, the automatic phosphor mixing apparatus 100 may further include a container supply unit 170 and a container discharge unit 172. The container supply unit 170 newly supplies an empty mixing container 110 to the transfer unit 150, being disposed at an entrance 150*a* of the transfer unit 150. The container discharge unit 172 may discharge the mixing container 110 in which the first silicon, the second silicon, and the phosphors are received, from the transfer unit 150. The container discharge unit 172 may be disposed at an exit 150*b* of the transfer unit 150.

Therefore, the mixing container 110 may be continuously supplied to and discharged from the transfer unit 150, one by one, respectively by the container supply unit 170 and the container discharge unit 172. In other words, for example, at least five mixing containers 110 may be provided on the transfer path of the transfer unit 150. The at least five mixing containers 110 may be simultaneously supplied with the first silicon, the second silicon, and the phosphors by the first silicon supply unit 120, the second silicon supply unit 130, and the phosphor supply units 140, 142, and 144, respectively.

After the mixing container 110 is discharged by the container discharge unit 172, a mixture of the first silicon, the second silicon and the phosphors received in the mixing container 110 is put into a syringe 180. The syringe 180 may inject the mixture into a light emitting diode (LED) package.

Referring to FIGS. 1 and 2, the automatic phosphor mixing apparatus 100 may include container sensing units 174 and 176 adapted to detect the mixing container 110. The container sensing units 174 and 176 may include a first container sensing unit 174 to detect the mixing container 110 being supplied from the container supply unit 170 to the transfer unit 150, and a second container sensing unit 176 to detect the mixing container 110 being discharged from the transfer unit 150 to the container discharge unit 172.

The first container sensing unit 174 may be disposed at a connection portion between the container supply unit 170 and the transfer unit 150. The second container sensing unit 176 may be disposed at a connection portion between the container discharge unit 172 and the transfer unit 150. Therefore, whether the mixing container 110 are supplied and discharged, and a number of the mixing container 110 being supplied or discharged may be detected by the first container sensing unit 174 and the second container sensing unit 176.

The mixing container 110 may be provided with a barcode detected by the first container sensing unit 174 and the second container sensing unit 176. The barcode may contain mixing information related to the first silicon, the second silicon, and the phosphors. For example, the mixing information may include a feed quantity of the first silicon, a feed quantity of the second silicon, feed quantities of the phosphors, and a serial number of the corresponding mixing container 110.

Therefore, when the first container sensing unit 174 detects the barcode of the mixing container 110 entering the transfer unit 150, the mixing information of the barcode is transmitted to the control unit 160. According to the mixing information, the control unit 160 may properly control operations of the transfer unit 150, the first silicon supply unit 120, the second silicon supply unit 130, and the phosphor supply units 140, 142, and 144.

Figure 3:
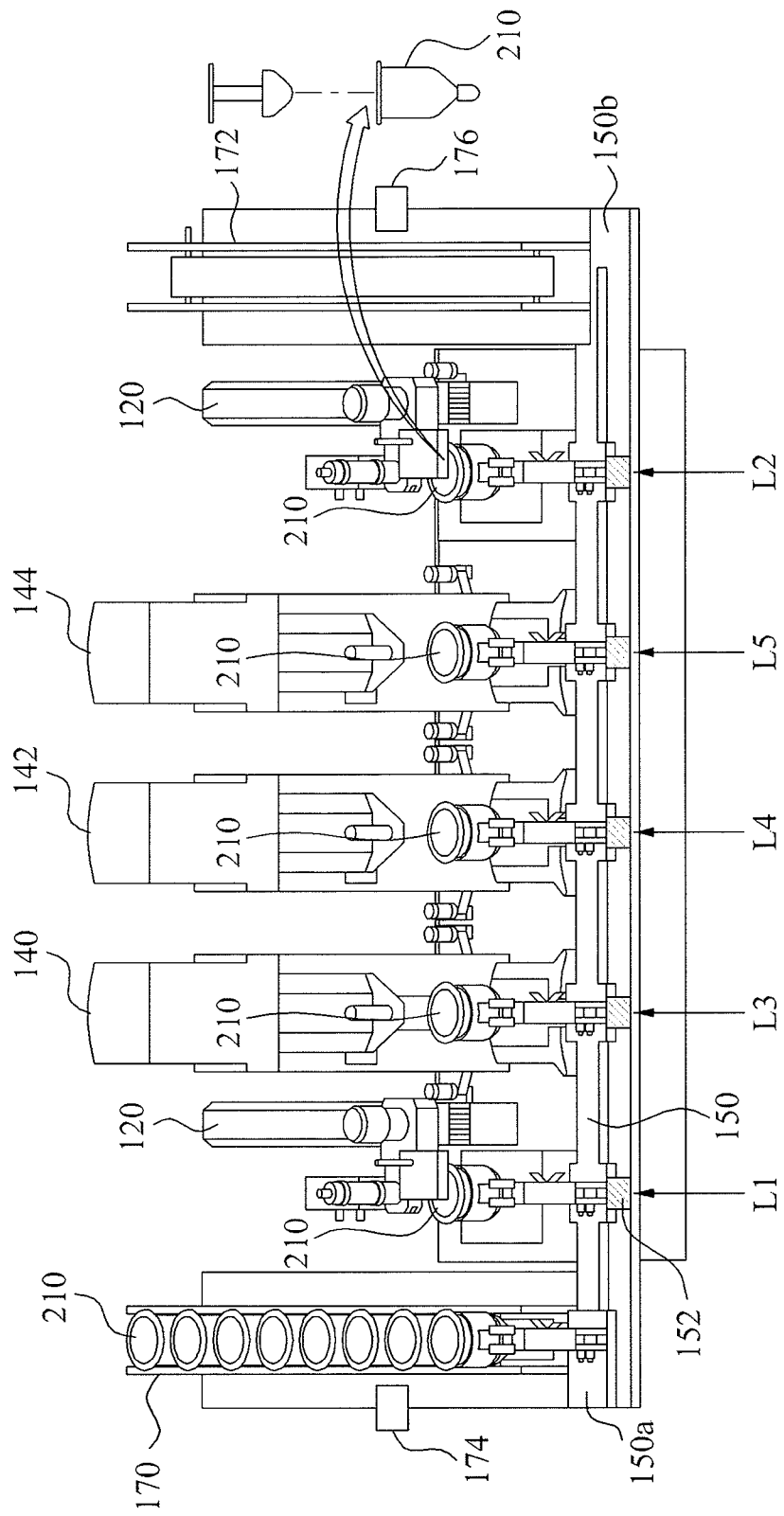
FIGS. 3 to 5 illustrate diagrams showing various structures of an automatic phosphor mixing apparatus according to other example embodiments.
Figure 4:
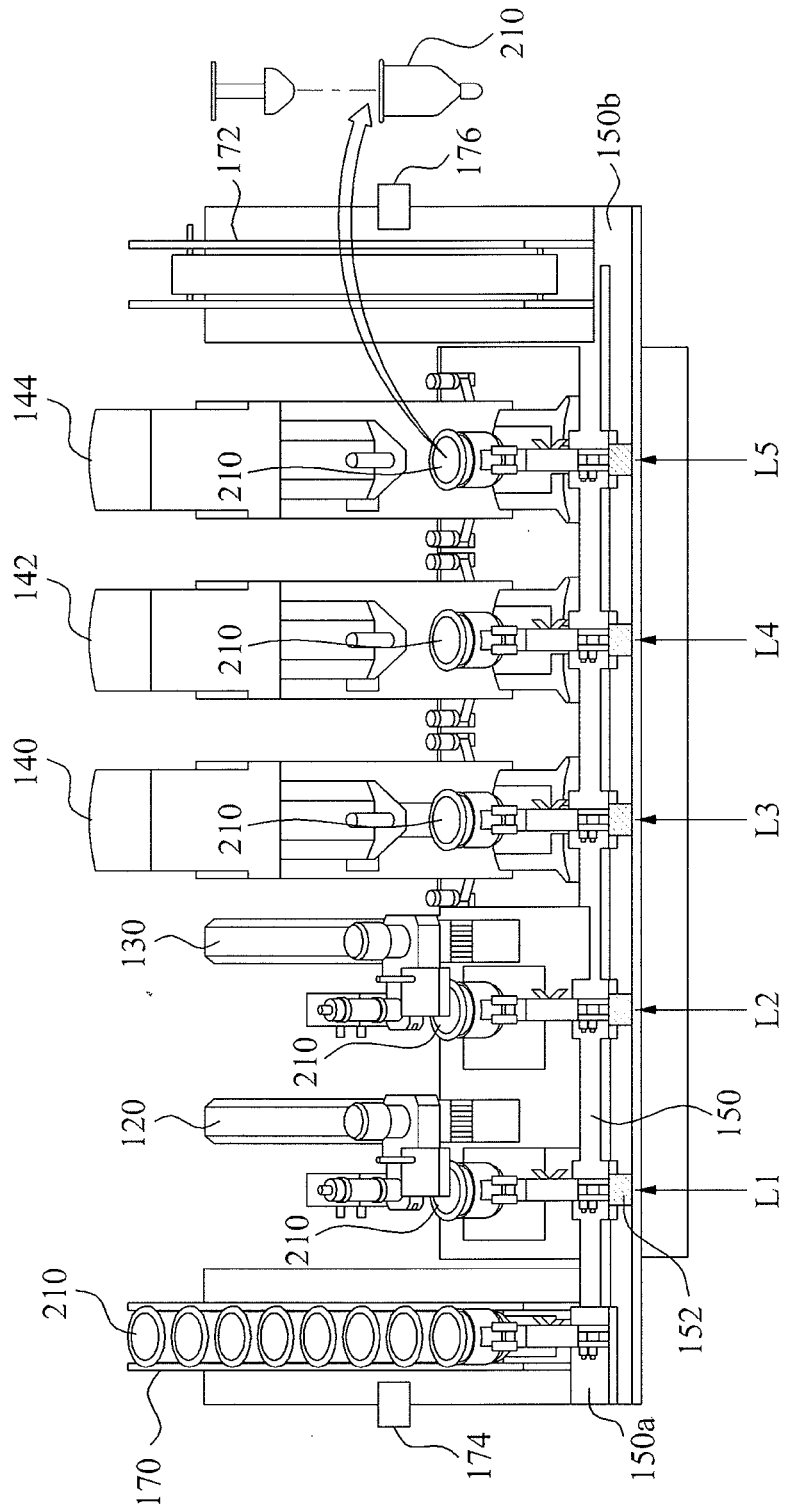
Figure 5:
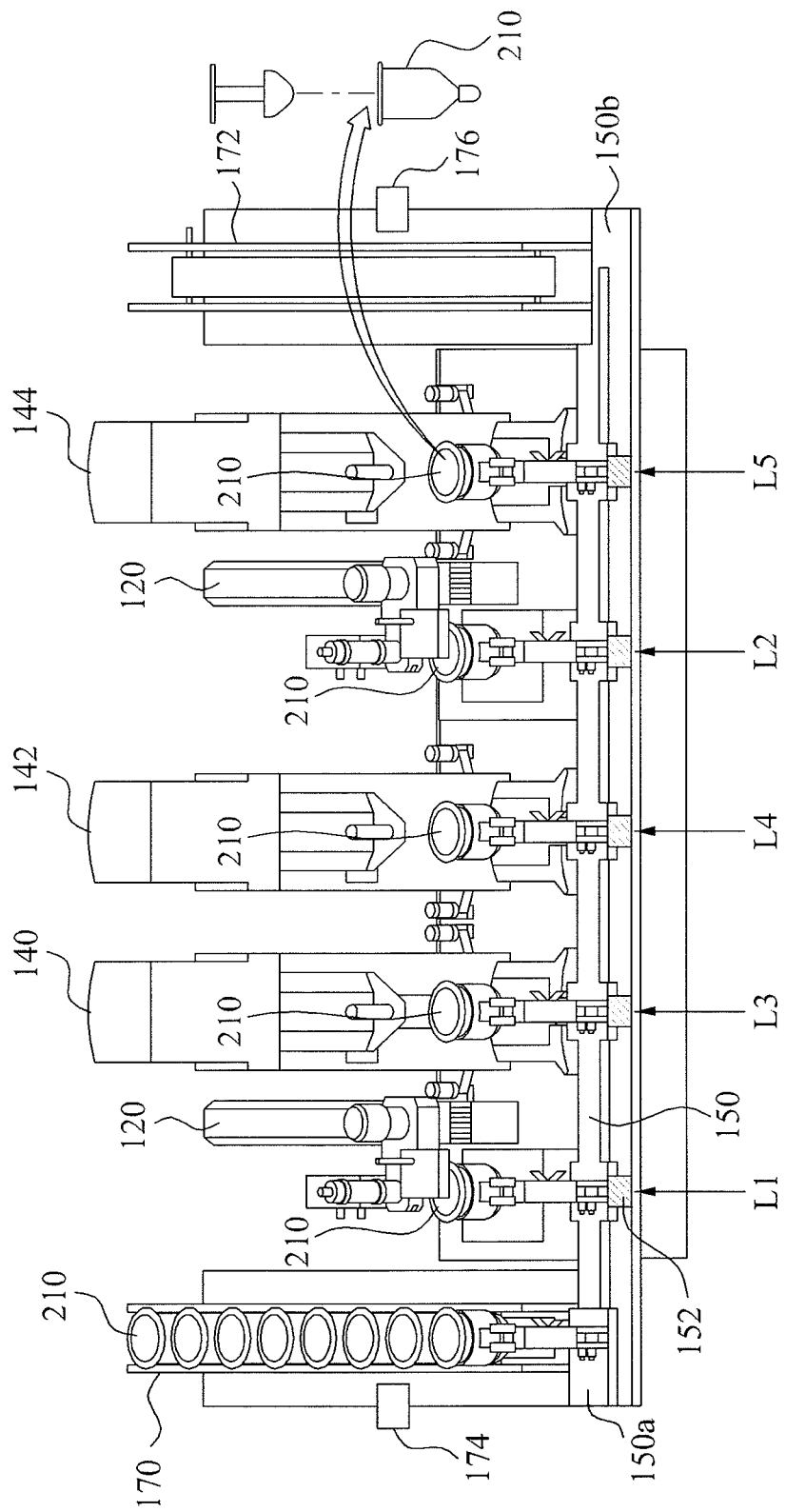
Figure 6:
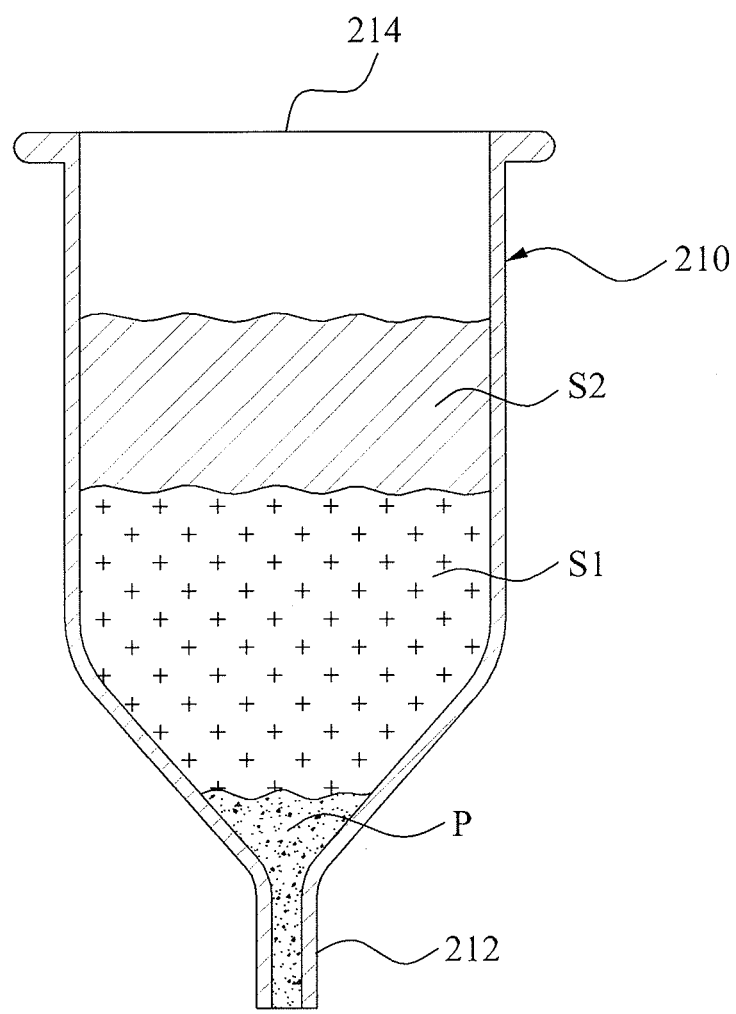
FIG. 6 illustrates a sectional view showing a state where a phosphor is supplied first to a mixing container, of the automatic phosphor mixing apparatus shown in FIGS. 3 to 5.
Figure 7:
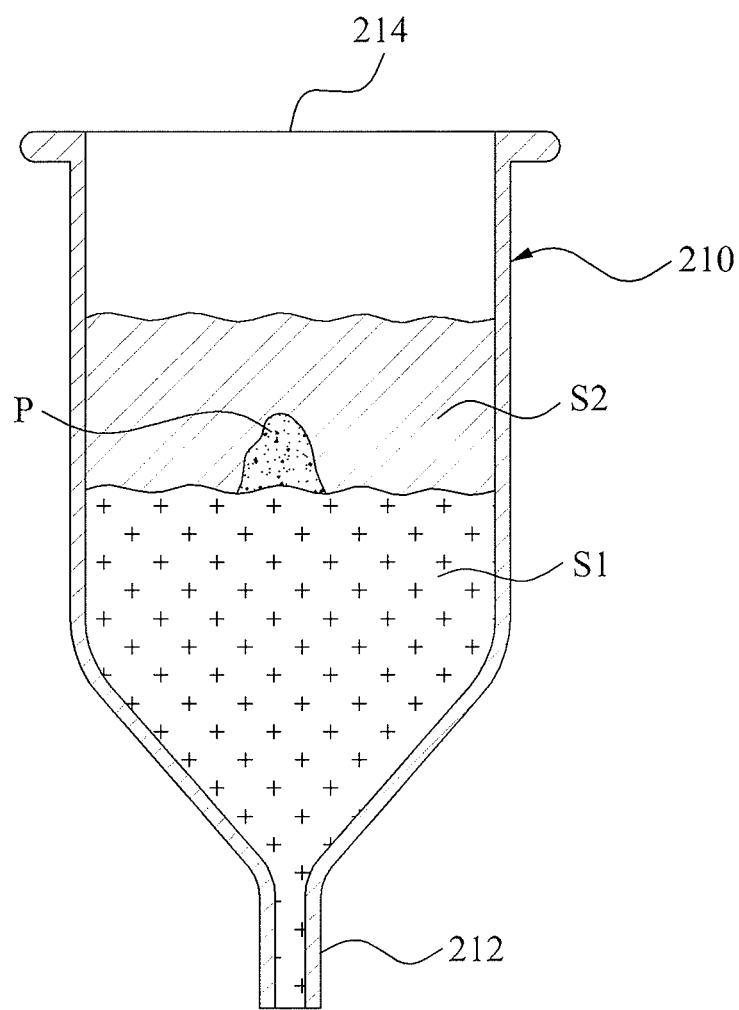
FIG. 7 illustrates a sectional diagram showing an inside of the mixing container discharged from the automatic phosphor mixing apparatus shown in FIG. 3.
Figure 8:
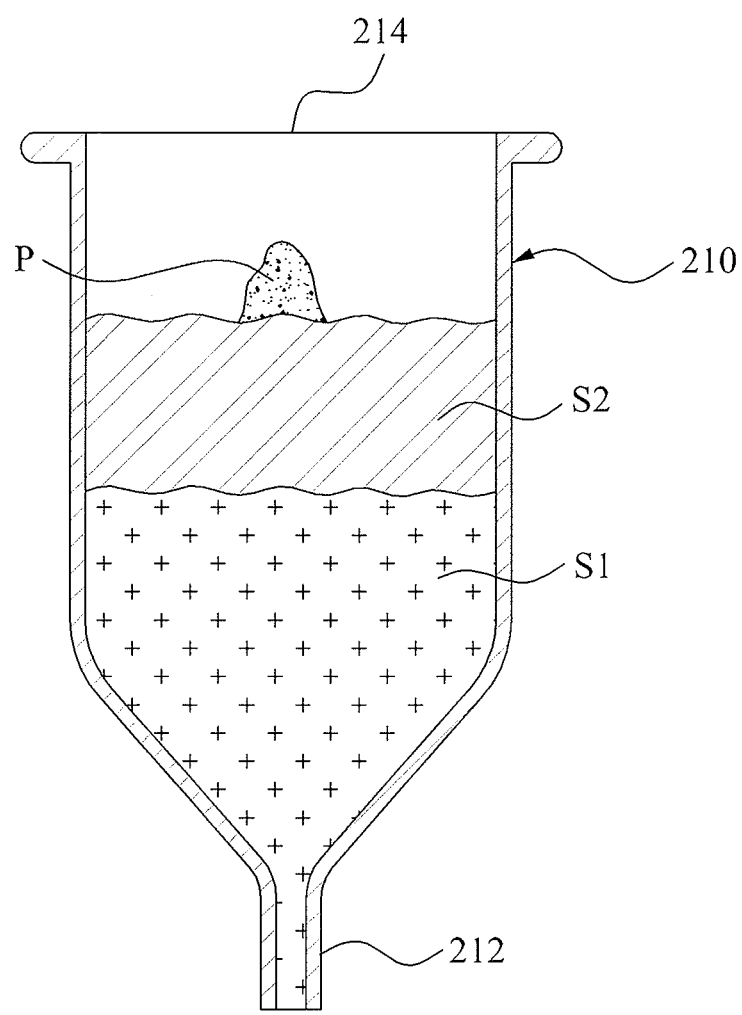
FIG. 8 illustrates a sectional diagram showing an inside of the mixing container discharged from the automatic phosphor mixing apparatus shown in FIG. 4.
Figure 9:
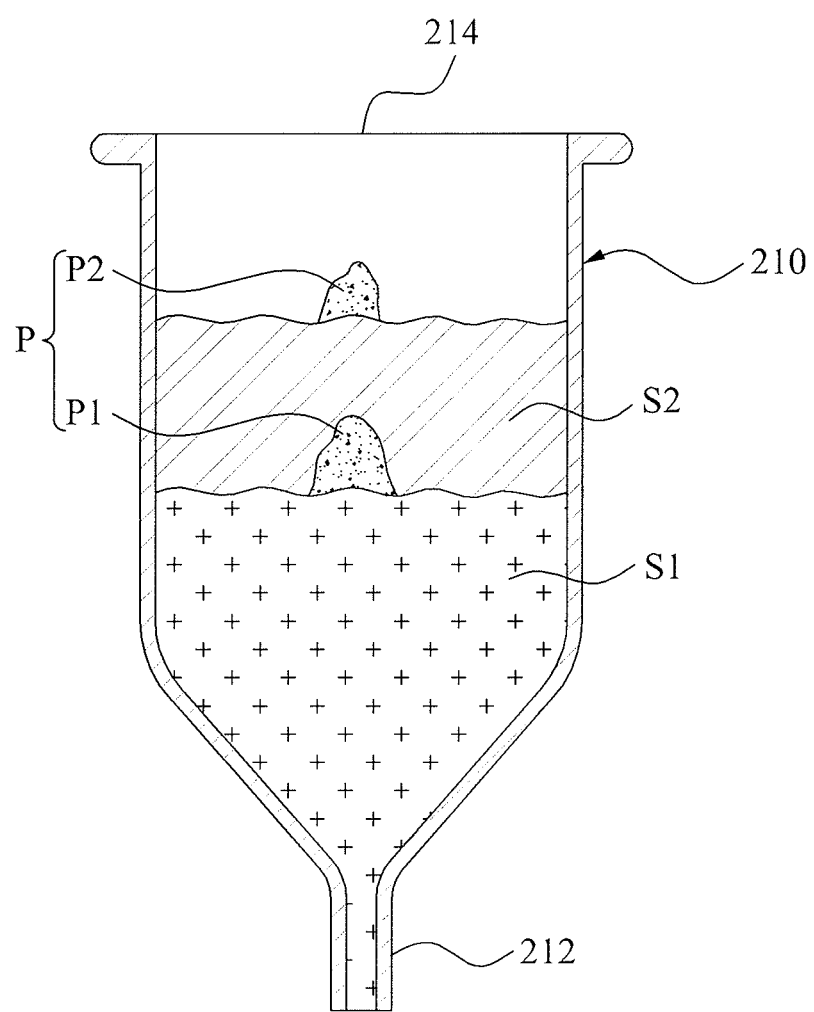
FIG. 9 illustrates a sectional diagram showing an inside of the mixing container discharged from the automatic phosphor mixing apparatus shown in FIG. 5.

FIGS. 3 to 5 illustrate diagrams showing various structures of an automatic phosphor mixing apparatus 200 according to other example embodiments. FIG. 6 illustrates a sectional view showing a state where phosphors is supplied first to a mixing container of the automatic phosphor mixing apparatus 200 shown in FIGS. 3 to FIG. 5. FIG. 7 illustrates a sectional diagram showing an inside of the mixing container discharged from the automatic phosphor mixing apparatus 200 shown in FIG. 3. FIG. 8 illustrates a sectional diagram showing an inside of the mixing container discharged from the automatic phosphor mixing apparatus 200 shown in FIG. 4. FIG. 9 illustrates a sectional diagram showing an inside of the mixing container discharged from the automatic phosphor mixing apparatus 200 shown in FIG. 5.

In FIGS. 3 through 9, the same reference numerals used in FIGS. 1 and 2 denote the same elements and structures. Hereinafter, distinctive features of the automatic phosphor mixing apparatus 200 according to the present embodiments from the automatic phosphor mixing apparatus 100 shown in FIGS. 1 and 2 will be mainly described.

Referring to FIGS. 3 through 5, differently from the automatic phosphor mixing apparatus 100 shown in FIGS. 1 and 2, the automatic phosphor mixing apparatus 200 includes a mixing container 210 configured to receive and discharge the mixture of the first silicon, the second silicon, and accordingly, positions of the first silicon supply unit 120, the second silicon supply unit 130, and the phosphor supply units 140, 142, and 144 are restricted.

The mixing container 210 may be structured to be capable of both receiving the first silicon, the second silicon, and the phosphors, and discharging the mixture of them. For example, the mixing container 210 may be a syringe including an outlet 212 to discharge a mixture of a first silicon S1, a second silicon S2, and phosphors P as shown in FIGS. 6 through 8. Although the mixing container 210 will be explained as having the syringe form in the present embodiments, any other structures may be applied to the mixing container 210 as far as being capable of storing and discharging the first silicon S1, the second silicon S2, and the phosphors P.

Therefore, according to the present embodiments, the mixture of the first silicon S1, the second silicon S2, and the phosphors P may be injected directly into the LED package using the mixing container 210 discharged from the automatic phosphor mixing apparatus 200. That is, according to the above structure, the mixture does not have to be transferred to an intermediate member, thereby preventing entry of foreign substances and generation of bubbles that may be caused during the transfer.

When the mixing container 210 has the syringe form, the outlet 150*b* may be disposed at a lower portion of the mixing container 210 whereas an inlet 214 for the first silicon S1, the second silicon S2, and the phosphors P is disposed at an upper portion as shown in FIG. 6. Therefore, when the phosphors P in the fine powder state are supplied to the mixing container 210 first, the phosphors P may be collected to the outlet 150*b*, thereby clogging the outlet 150b. Also, since the phosphors P may be discharged through the outlet 150b, an error may occur regarding the mixing ratio and the mixing quantities of the first silicon S1, the second silicon S2, and the phosphors P.

To solve such a case, the phosphors P in the phosphor supply units 140, 142, and 144 may be supplied to the mixing container 210 after the first silicon S1 or the second silicon S2 is supplied by at least one of the first silicon supply unit 120 and the second silicon supply unit 130.

When at least one of the first silicon S1 and the second silicon S2 is supplied first so as to be disposed between the outlet 150b and the phosphors P, the phosphors P may be prevented from entering the outlet 150b.

Hereinafter, positions of the first silicon supply unit 120, the second silicon supply unit 130, and the phosphor supply units 140, 142, and 144 will be described in detail with reference to FIGS. 3 through 8. Here, the other structures except for the arrangement positions of the first silicon supply unit 120, the second silicon supply unit 130, and the phosphor supply units 140, 142, and 144 are almost the same as in the embodiments of FIGS. 1 and 2 and therefore will not be described again.

The first silicon supply unit 120 may be disposed in a first position L1 on the transfer path of the transfer unit 150. The second silicon supply unit 130 may be disposed in a second position L2 on the transfer path of the transfer unit 150.

The plurality of phosphor supply units, that is, the phosphor supply units 140, 142, and 144 may be provided according to types of the phosphors to be supplied to the mixing container 210. The phosphor supply units 140, 142, and 144 may be disposed in positions L3, L4, and L5 linearly and separately along the transfer path. Although the present embodiments are explained to have the three phosphor supply units 140, 142, and 144 to supply three types of the phosphors for convenience of explanation, the positions and the number of the phosphor supply units may be varied according to a design and conditions of the automatic phosphor mixing apparatus 200.

More specifically, the phosphor supply units 140, 142, and 144 may be disposed in the third position L3, the fourth position L4, and the fifth position L5, which are arranged linearly and separately on the transfer path of the transfer unit 150. The third position L3, the fourth position L4, and the fifth position L5 may be disposed after at least one of the first position L1 and the second position L2, with respect to a transfer direction of the transfer unit 150. That is, the phosphor supply units 140, 142, and 144 may be disposed after at least one of the first silicon supply unit 120 and the second silicon supply unit 130, with respect to the transfer direction.

Referring to FIGS. 3 and 7, the third position L3, the fourth position L4, and the fifth position L5 may be disposed between the first position L1 and the second position L2, with respect to the transfer direction of the transfer unit 150. That is, the phosphor supply units 140, 142, and 144 may be disposed between the first silicon supply unit 120 and the second silicon supply unit 130.

Accordingly, any one of the first silicon S1 and the second silicon S2 may be supplied first to the mixing container 210, the phosphors P may be supplied to a surface of the any one of the first silicon S1 and the second silicon S2, and the other one of the first silicon S1 and the second silicon S2 may be supplied finally.

Referring to FIGS. 4 and 8, the third position L3, the fourth position L4, and the fifth position L5 may be disposed after the first position L1 and the second position L2 with respect to the transfer direction. That is, the phosphor supply units 140, 142, and 144 may be disposed after the first silicon supply unit 120 and the second silicon supply unit 130 with respect to the transfer direction.

Accordingly, the first silicon S1 and the second silicon S2 may be first supplied to the mixing container 210, and the phosphors P may be finally supplied to the surfaces of the first silicon S1 and the second silicon S2.

Referring to FIGS. 5 and 9, at least one of the third position L3, the fourth position L4, and the fifth position L5 may be disposed between the first position L1 and the second position L2 while the others are disposed after the first position L1 and the second position L2 with respect to the transfer direction. In other words, at least one of the phosphor supply units 140, 142, and 144 may be disposed between the first silicon supply unit 120 and the second silicon supply unit 130 while the others may be disposed after the first silicon supply unit 120 and the second silicon supply unit 130.

Accordingly, any one of the first silicon S1 and the second silicon S2 is supplied first to the phosphor 210, and a part P1 of the phosphors P is supplied to a surface of the any one of the first silicon S1 and the second silicon S2. Next, the other one of the first silicon S1 first silicon S1 and the second silicon S2 is supplied, and the other part P2 of the phosphors P is finally supplied to a surface of the other one of the first silicon S1 and the second silicon S2.

Figure 10:
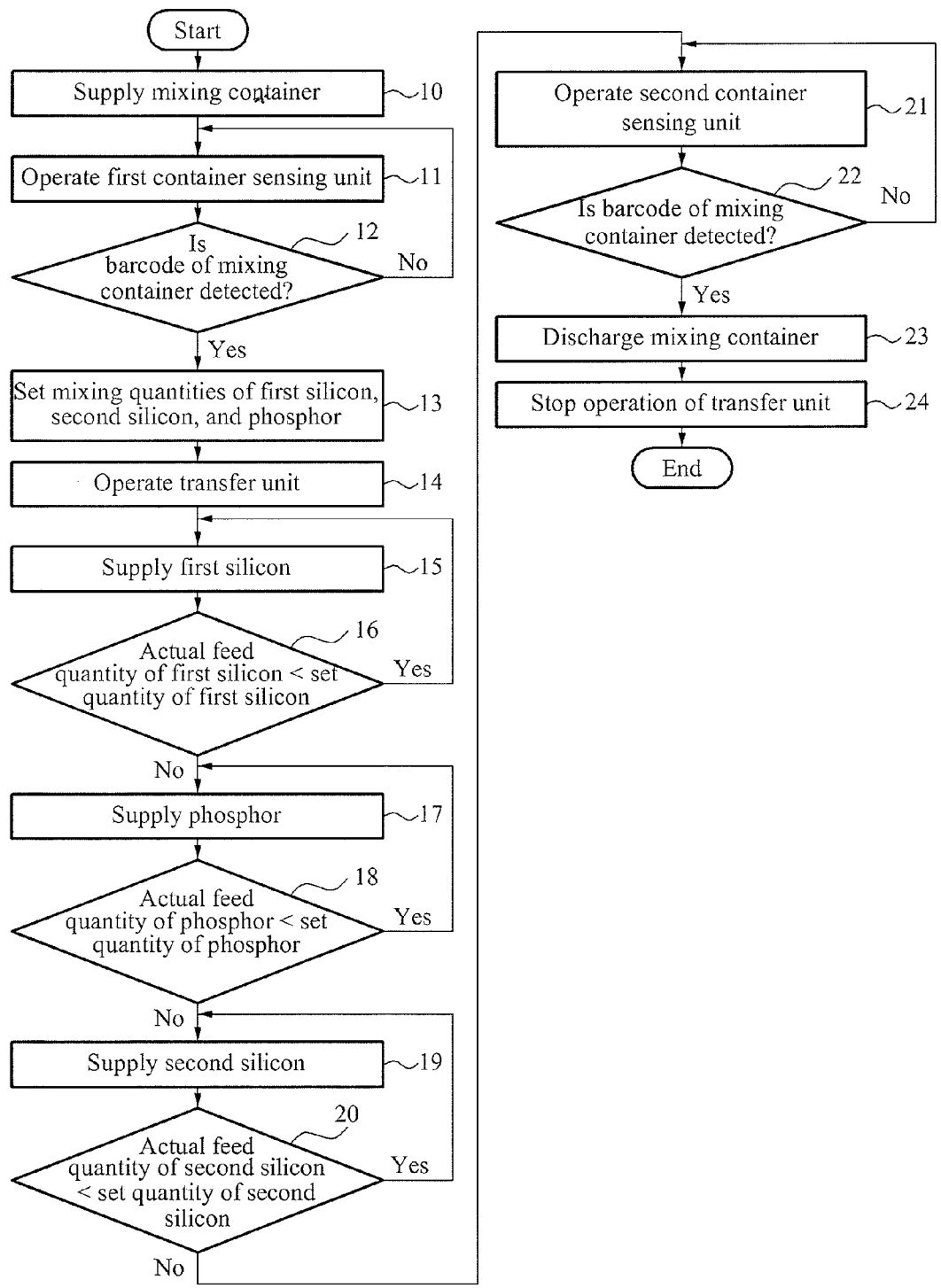
FIG. 10 illustrates a flowchart showing a mixing method of the automatic phosphor mixing apparatus shown in FIG. 3.

The operation and the effect of the above-structured automatic phosphor mixing apparatus 200 shown in FIG. 3 will be described hereinafter. FIG. 10 illustrates a flowchart showing a mixing method of the automatic phosphor mixing apparatus shown in FIG. 3. Here, the method will be described about a case where a plurality of the mixing containers 210 are used.

First, the container supply unit 170 supplies the mixing containers 210 to the inlet 150a of the transfer unit 150 in operation 10. Here, the container supply unit 170 may supply the mixing containers 210, to the transfer 150 continuously by a predetermined time period.

During this, the first container sensing unit 174 detects the mixing containers 210 being supplied to the transfer unit 150 in operation 11. During this, the first container sensing unit 174 may detect barcodes formed on the mixing containers 210 in operation 12.

In operation 13, the feed quantities of the first silicon, the second silicon, and the phosphors are set using mixing information of the barcodes detected by the first container sensing unit 174. That is, in operation 13, the mixing information detected from the barcodes of the mixing containers 210 may be transmitted to the control unit 160. The control unit 160 sets the feed quantities using the mixing information.

In operation 14, the transfer unit 150 transfers the mixing containers 210 sequentially to the first silicon supply unit 120, the second silicon supply unit 130, and the phosphor supply units 140, 142, and 144. During this, when the mixing containers 210 are detected by the first container sensing unit 174, the transfer unit 150 is operated to transfer the mixing containers 210 from the inlet 150a to the outlet 150b of the transfer unit 150. The mixing containers 210 pass through all of the first silicon supply unit 120, the second silicon supply unit 130, and the phosphor supply units 140, 142, and 144.

In operations 15 to 20, the silicon supply unit 120, the second silicon supply unit 130, and the phosphor supply units 140, 142, and 144 supply the first silicon, the second silicon, and the phosphors to the mixing container 210 respectively to predetermined quantities.

More specifically, operations 15 to 20 may include operations 15 and 16 to supply the first silicon to the predetermined quantity by the first silicon supply unit 120, operations 19 and 20 to supply the second silicon to the predetermined quantity, by the second supply unit 130, and operations 17 and 18 to supply the phosphors to the predetermined quantity by the phosphor supply units 140, 142, and 144.

The supplying of the phosphors may be performed after at least one of the supplying of the first silicon or the supplying of the second silicon. According to the example embodiments as shown in FIGS. 3 through 10, operations 17 and 18 to supply the phosphors are performed between operations 15 and 16 to supply the first silicon and operations 19 and 20 to supply the second silicon.

During operations 15 to 20, the weight measurement device 152 of the transfer unit 150 may measure the weight change of the mixing containers 210 in real time. The control unit 160 may control the operations of the first silicon unit 120, the second silicon unit 130, and the phosphor supply units 140, 142, and 144 in real time, according to the weight change of the mixing containers 210.

For example, the feed quantities for the first silicon unit 120, the second silicon unit 130, and the phosphor supply units 140, 142, and 144 may be predetermined by the control unit 160, according to the mixing information contained in the barcode of the mixing containers 210. The control unit 160 may control feeding time of the first silicon unit 120, the second silicon unit 130, and the phosphor supply units 140, 142, and 144 according to the predetermined feed quantities, thereby controlling the feed quantities of the first silicon, the second silicon, and the phosphors. In addition, the control unit 160 may check actual feed quantities of the first silicon, the second silicon, and the phosphors being supplied to the mixing containers 210 in real time, using detection values of the weight measurement device 152. Therefore, the operations of the first silicon unit 120, the second silicon unit 130, and the phosphor supply units 140, 142, and 144 may be properly controlled in real time.

The second container sensing unit 176 may detect the mixing containers 210 being discharged through the outlet 150b of the transfer unit 150, in operations 21 and 22. In operations 21 and 22, specifically, the second container sensing unit 176 may detect the mixing containers 210 being discharged from the transfer unit 150 to the container discharge unit 172.

The container discharge unit 172 discharges the mixing containers 210 receiving the first silicon, the second silicon, and the phosphors to the outside in operation 23. In operation 23, specifically, the mixing containers 210 passed through the first silicon unit 120, the second silicon unit 130, and the phosphor supply units 140, 142, and 144 are discharged to the outside of the automatic phosphor mixing apparatus 200.

The control unit 160 may determine whether any of the mixing containers 210 are present in the transfer unit 150, by comparing detection values of the first container sensing unit 174 and the second container sensing unit 176. When the mixing container 210 detected by the first container sensing unit 174 is also detected by the second container sensing unit 176, the control unit 160 may determine that the transfer unit 150 is transferring none of the mixing containers 210 and stop the operation of the transfer unit 150, in operation 24.

When the mixing containers 210 are completely discharged, out of the automatic phosphor mixing apparatus 200, the mixture of the first silicon, the second silicon, and the phosphors may be injected in the LED package using the mixing containers 210 having the syringe form.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus comprising:
   a container configured to receive a liquid silicone, and a powdered phosphor, wherein the container has a syringe structure including an outlet disposed at a lower portion thereof, and a mixture of the liquid silicone and the powdered phosphor is discharged into a light emitting diode (LED) package through the outlet;
   a silicone supply unit configured to supply the liquid silicone to the container up to a predetermined quantity;
   a phosphor supply unit configured to supply the powdered phosphor to the container up to a predetermined quantity; and
   a transfer unit configured to transfer the container from the silicone supply unit to the phosphor supply unit, such that the container is sequentially provided with the liquid silicone and the powdered phosphor, and the outlet is prevented from being clogged by the powdered phosphor,
   wherein the silicone supply unit and the phosphor supply unit have different structures from each other.

2. The apparatus of claim 1, further comprising:
   a container supply unit disposed at an entrance of the transfer unit and configured to supply the container to the transfer unit; and
   a container discharge unit disposed at an exit of the transfer unit and configured to discharge the container receiving the liquid silicone and the powdered phosphor, from the transfer unit.

3. The apparatus of claim 2, further comprising a first container sensing unit disposed at a connection portion, between the container supply unit and the transfer unit, and configured to detect the container being supplied from the container supply unit to the transfer unit.

4. The apparatus of claim 3, wherein:
   the container comprises a barcode containing mixing information related to the liquid silicone and the powdered phosphor,
   the first container sensing unit is configured to read the barcode of the container to identify the mixing information, and
   the apparatus further comprises a control unit configured to control the transfer unit, the silicone supply unit, and the phosphor supply unit according to the mixing information of the barcode detected by the first container sensing unit.

5. The apparatus of claim 4, wherein the mixing information comprises a feed quantity of the liquid silicone and a feed quantity of the powdered phosphor.

6. The apparatus of claim 3, further comprising a second container sensing unit disposed at a connection portion between the container discharge unit and the transfer unit and configured to detect the container being discharged from the transfer unit to the container discharge unit.

7. The apparatus of claim 1, wherein the transfer unit comprises a weight measurement device configured to measure a weight change of the container.

8. The apparatus of claim 1, wherein a plurality of phosphor supply units are provided, the plurality of phosphor supply units being configured to supply different types of phosphors from one another, and arranged along a transfer path of the transfer unit.

9. An apparatus comprising:

a container configured to receive a first liquid silicone, a second liquid silicone, and a powdered phosphor;

a first silicone supply unit configured to supply the first liquid silicone to the container up to a predetermined quantity;

a second silicone supply unit configured to supply the second liquid silicone to the container up to a predetermined quantity;

a phosphor supply unit configured to supply the powdered phosphor to the container up to a predetermined quantity; and a transfer unit configured to transfer the container from at least one of the first and second silicone supply unit to the phosphor supply unit, such that the container is sequentially provided with at least one of the first and second liquid silicone and the powdered phosphor, and the outlet is prevented from being clogged by the powdered phosphor, wherein:

the container has a syringe structure including an outlet disposed at a lower portion thereof, a mixture of the first liquid silicone, the second liquid silicone, and the powdered phosphor is discharged into an light emitting diode (LED) package through the outlet, the first and second liquid silicone are mixed and then cured, and at least one of the first and second silicone supply units and the phosphor supply units have different structures.

10. The apparatus of claim 9, wherein the phosphor supply unit is disposed between the first and second silicone supply units with respect to a transfer direction of the transfer unit.

11. The apparatus of claim 9, wherein the phosphor supply unit is disposed after the first and second silicone supply unit with respect to a transfer direction of the transfer unit.

12. The apparatus of claim 9, wherein a plurality of phosphor supply units are provided, the plurality of phosphor supply units being configured to supply different types of phosphors from one another, and at least one of the plurality of phosphor supply units is disposed between the first and second silicone supply units with respect to a transfer direction of the transfer unit.

* * * * *